(12) United States Patent
Shimizu

(10) Patent No.: US 6,899,952 B2
(45) Date of Patent: May 31, 2005

(54) POLYSULFONE-BASED RESIN SOLUTION COMPOSITION AND LAMINATE USING THE SAME

(75) Inventor: Kiyoshi Shimizu, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 10/439,321

(22) Filed: May 16, 2003

(65) Prior Publication Data

US 2004/0081846 A1 Apr. 29, 2004

(30) Foreign Application Priority Data

Oct. 28, 2002 (JP) ......................................... 2002-312725

(51) Int. Cl.$^7$ ................................................. B32B 9/04
(52) U.S. Cl. .................... 428/411.1; 524/107; 524/111; 524/356; 524/359; 524/360; 524/609; 524/611
(58) Field of Search ................................ 524/107, 111, 524/356, 359, 360, 609, 611; 428/411.1, 419

(56) References Cited

U.S. PATENT DOCUMENTS 4,020,046 A * 4/1977 King et al. .................. 525/137
4,598,137 A * 7/1986 Guiver et al. ................ 528/173
4,642,170 A * 2/1987 Alvino et al. ................ 204/489

FOREIGN PATENT DOCUMENTS

| JP | 7-024858 | 1/1995 |
| JP | 7-300559 | 11/1995 |
| JP | 8-321219 | 12/1996 |

* cited by examiner

Primary Examiner—Ramsey Zacharia
(74) Attorney, Agent, or Firm—Armstrong, Kratz, Quintos, Hanson & Brooks, LLP (57) ABSTRACT

A polysulfone-based resin solution composition which is stable, contains no undissolved resin left in the liquid, shows neither thickening nor gelation, gives a smooth coating layer when spread on a base film and does not generate any harmful component, and a laminate which is produced by spreading and drying the same polysulfone-based resin solution composition on a base film surface. More specifically, a polysulfone-based resin solution composition prepared by dissolving at least one type of polysulfone-based resin in a mixed solvent composed of a lactone (A) or ketone (B) having an aromatic ring, and cycloketone (C) and aliphatic ketone (D) having a boiling point of 150° C. or lower, and a laminate which is produced by spreading and drying the same polysulfone-based resin solution composition on a base film surface.

4 Claims, 5 Drawing Sheets

POLYSULFONE-BASED RESIN SOLUTION COMPOSITION AND LAMINATE USING THE SAME

BACKGROUND OF THE INVENTION

1. Field of the Invention

The present invention relates to a polysulfone-based resin solution composition and laminate using the same, more particularly a polysulfone-based resin solution composition which forms a smooth coating layer when spread on a base surface, and does not generate any harmful component, and a laminate which is produced by spreading and drying the same polysulfone-based resin solution composition on a base surface.

The laminate has sufficiently excellent optical and surface characteristics to be used for a heat-resistant optical film or the like.

2. Description of the Prior Art

A polysulfone-based resin is excellent in various properties, e.g., heat resistance, dimensional stability, mechanical characteristics, creep resistance, flame retardancy, safety to humans, and acid and alkali resistance. Moreover, it has a very high solubility parameter (SP value) and peculiar properties. As such, the molded articles of the resin have been widely used in various industrial areas, e.g., electric/electronic devices (e.g., printed circuit boards, connectors, coil bobbins, bushings, condenser films and alkali battery cases), automobile parts (e.g., battery caps, fuses, sensors and ignitions), and other industrial products (e.g., ultrafiltration modules, chemical pumps and plating rolls).

It is also used for coating materials, paints, adhesive agents and films with its excellent characteristics described above. When these products are produced, normally a polysulfone-based resin is dissolved in a solvent to prepare the solution composition, which is dried either directly or after being spread on a base surface.

The representative products include a heat-resistant optical film used for producing transparent electrode bases for liquid crystal displays.

A base of glass has been employed as a transparent electrode base for liquid crystal displays, because of its excellent optical characteristics and very high surface smoothness, when ground. However, a glass board is high in density and should be itself sufficiently thick because of its fragility. Therefore, it is difficult to make a liquid crystal display on a glass base compact, light and resistant to impact. Use of a high-molecular-weight film has been proposed as a method to solve the disadvantages of the devices which include a glass base (e.g., Japanese Patent Laid-open Publication No.53-68099 and Japanese Patent Laid-open Publication No.54-126559).

Japanese Patent Laid-open Publication No.53-68099 and Japanese Patent Laid-open Publication No.54-126559 disclose continuous production of liquid crystal displays using a long polyester film coated with an electroconductive oxidized metallic material by evaporation, in place of a glass base. However, no polyester film having as smooth a surface as that of glass base has been produced.

In particular, when a liquid crystal display is made super twisted nematic (STN) to produce highly precise images, surface smoothness of high-molecular-weight film is very important, because the image is displayed using birefringence of liquid crystal between bases arranged at controlled intervals of the order of 0.1 $\mu$m.

An optical plastic laminated sheet excellent in heat resistance and transparency has been proposed as the one which can solve the problems involved in the polyester film, as disclosed by, e.g., Japanese Patent Laid-open Publication No.49-110725. It is composed of at least one layer of polysulfone-based resin (first layer) and second layer of optically transparent material (polysulfone-based resin) having a glass transition temperature lower than that of the first layer.

The laminated sheet disclosed by the patent document, although technically improved in that it includes polysulfone-based resin, which has higher heat resistance and better optical characteristics than the plastic which constitutes each layer, is produced by melt coextrusion, or lamination of each layer individually produced by solvent casting or melt extrusion to have a film of desired thickness. However, the laminated sheet produced by the above procedure has insufficient surface smoothness.

For production of a solution composition of polysulfone-based resin, on the other hand, use of a mixed solvent of strongly acidic, inert liquids of dimethyl sulfoxide (DMSO) and dimethyl formamide (DMF) as the main components, and alicyclic ketone and highly volatile aliphatic ketone is proposed by, e.g., Japanese Patent Laid-open Publication No.49-110725.

However, the above solution composition involves problems of poor smoothness of the coating surface, evaporation while it is being spread and dried, and generation of harmful components, e.g., SOx and NOx while it is combusted for disposal.

SUMMARY OF THE INVENTION

It is an object of the present invention to provide a polysulfone-based resin solution composition which forms a smooth coating layer, when spread on a base surface, and does not generate any harmful component, in consideration of the problems involved in the conventional techniques. It is another object of the present invention to provide a laminate which is produced by spreading and drying the same polysulfone-based resin solution composition on a base surface.

The inventors of the present invention have prepared solution compositions of polysulfone-based resin dissolved in varying mixed solvents and laminates by spreading and drying the compositions on base films, and evaluated the laminates as heat-resistant optical films, to find that mixtures of specific combinations of solvents give good results, achieving the present invention.

First aspect of the present invention provides a polysulfone-based resin solution composition prepared by dissolving at least one type of polysulfone-based resin in a mixed solvent composed of a lactone (A) or ketone (B) having an aromatic ring, and cycloketone (C) and aliphatic ketone (D) having a boiling point of 150° C. or lower.

Second aspect of the present invention provides the polysulfone-based resin solution composition of the first aspect which simultaneously satisfies the following formulae (1) to (4), wherein "a," "b," "c" and "d" are contents (parts by volume per 100 parts by volume of the mixed solvent) of the lactone (A), ketone (B), cycloketone (C) and aliphatic ketone (D), respectively:

$$80 \geq (a \text{ or } b) \geq 10 \qquad (1)$$

$$70 \geq c \geq 5 \qquad (2)$$

$$50 \geq d \geq 5 \quad (3)$$

$$(a \text{ or } b)+c+d=100 \quad (4)$$

Third aspect of the present invention provides the polysulfone-based resin solution composition of the first aspect, wherein the polysulfone-based resin is incorporated at 1 to 30 parts by weight per 100 parts by weight of the mixed solvent.

Fourth aspect of the present invention provides a laminate with a coating layer of polysulfone-based resin which is formed by spreading and drying the polysulfone-based resin solution composition of one of the first to third aspects on at least one side of a base.

NOTATION

1 Wire bar (cross-sectional view)
1' Wire bar (side-sectional view)
2 Wire
3 Rod (bar)
4 Base film
4a Base film surface on which the solvent composition is spread
5 Spaces formed between the line running on the wire apexes and wound wire
6 Base film sending roll
7 Doctor blade
8 Back-up roll
9 Polysulfone-based resin solution composition
10 Solution composition transfer tube
11 Solution composition discharge tube
12 Storage tank
13 Table with concave surface
14 Stirrer
15 Coater equipped with a smaller-diameter wire bar
16 Coater equipped with a larger-diameter wire bar

DETAILED DESCRIPTION OF THE INVENTION

The polysulfone-based resin solution composition of the present invention and laminate using the composition are described in detail for each item.

1. Mixed Solvent

The mixed solvent for the present invention means a mixed solvent which can dissolve a polysulfone-based resin to prepare the polysulfone-based resin solution composition.

The mixed solvent for the present invention is composed of a lactone (A) or ketone (B) having an aromatic ring, and cycloketone (C) and aliphatic ketone (D) having a boiling point of 150° C. or lower, and should simultaneously satisfy the following formulae (1) to (4), wherein "a," "b," "c" and "d" are contents (parts by volume per 100 parts by volume of the mixed solvent) of the lactone (A), ketone (B), cycloketone (C) and aliphatic ketone (D), respectively:

$$80 \geq (a \text{ or } b) \geq 10 \quad (1)$$

$$70 \geq c \geq 5 \quad (2)$$

$$50 \geq d \geq 5 \quad (3)$$

$$(a \text{ or } b)+c+d=100 \quad (4)$$

Figure 1:
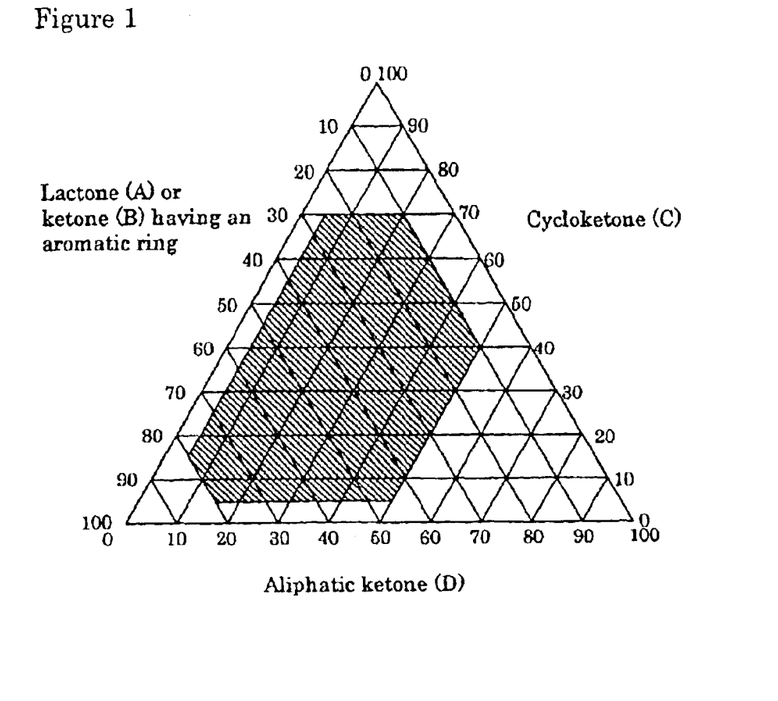
FIG. 1 is a phase diagram of the 3 components constituting the mixed solvent for the present invention.

The range in which the formulae (1) to (4) are simultaneously satisfied is illustrated in the triangular phase diagram shown in FIG. 1. First, how to read the diagram is described.

Referring to FIG. 1, the phase diagram is shown on a regular triangle. The left side serves as the axis for content of the lactone (A) or ketone (B) having an aromatic ring (volumetric part(s) per 100 parts of the mixed solvent), from 0 (apex) to 100 (left end of the bottom side) parts by volume with degrees marked at intervals of 10 parts by volume. For example, 10 parts by volume of the lactone (A) or ketone (B) having an aromatic ring is represented by the line a-b shown in FIG. 2, and 80 parts by volume by the line c-d in FIG. 2. Therefore, the range in which the relationship of the formula (1) for the lactone (A) or ketone (B) having an aromatic ring is satisfied is represented by the small triangles with a dot at the center, shown in FIG. 2.

Similarly, the right side serves as the axis for content of the cycloketone (C) (volumetric part(s) per 100 parts of the mixed solvent), from 0 (right end of the bottom side) to 100 (apex) parts by volume with degrees marked at intervals of 10 parts by volume. For example, 5 parts by volume of the cycloketone (C) is represented by the line e-f shown in FIG. 3, and 70 parts by volume by the line g-h in FIG. 3. Therefore, the range in which the relationship of the formula (2) for the cycloketone (C) is satisfied is represented by the small triangles with a dot at the center, shown in FIG. 3.

Similarly, the bottom side serves as the axis for content of the aliphatic ketone (D) (volumetric part(s) per 100 parts of the mixed solvent), from 0 (left end of the bottom side) to 100 (right end of the bottom side) parts by volume with degrees marked at intervals of 10 parts by volume. For example, 5 parts by volume of the aliphatic ketone (D) is represented by the line i-j shown in FIG. 4, and 50 parts by volume by the line k-l in FIG. 4. Therefore, the range in which the relationship of the formula (3) for the aliphatic ketone (D) is satisfied is represented by the small triangles with a dot at the center, shown in FIG. 4.

Figure 2:
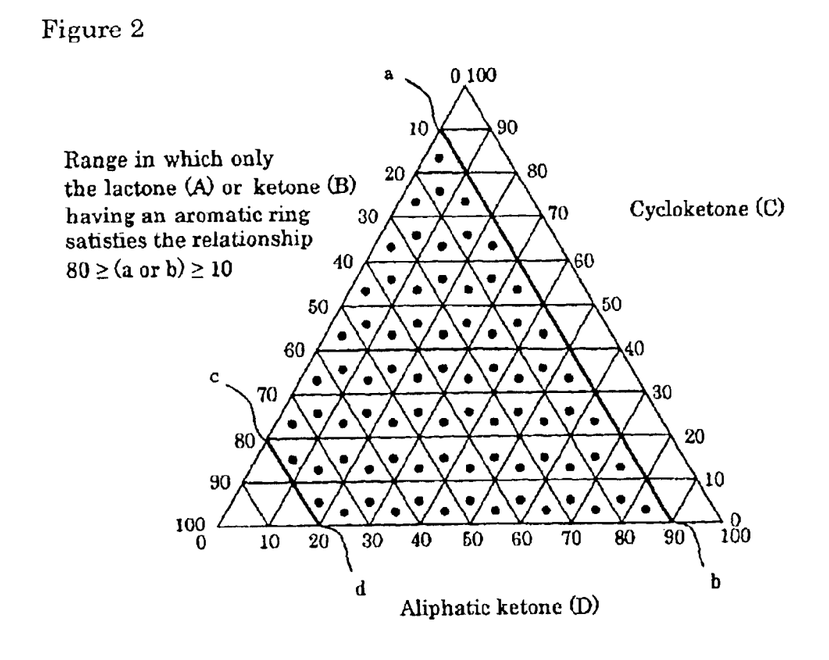
FIG. 2 is a diagram showing the range in which the lactone (A) or ketone (B) having an aromatic ring satisfies the relationship $80 \geq (a \text{ or } b) \geq 10$.
Figure 3:
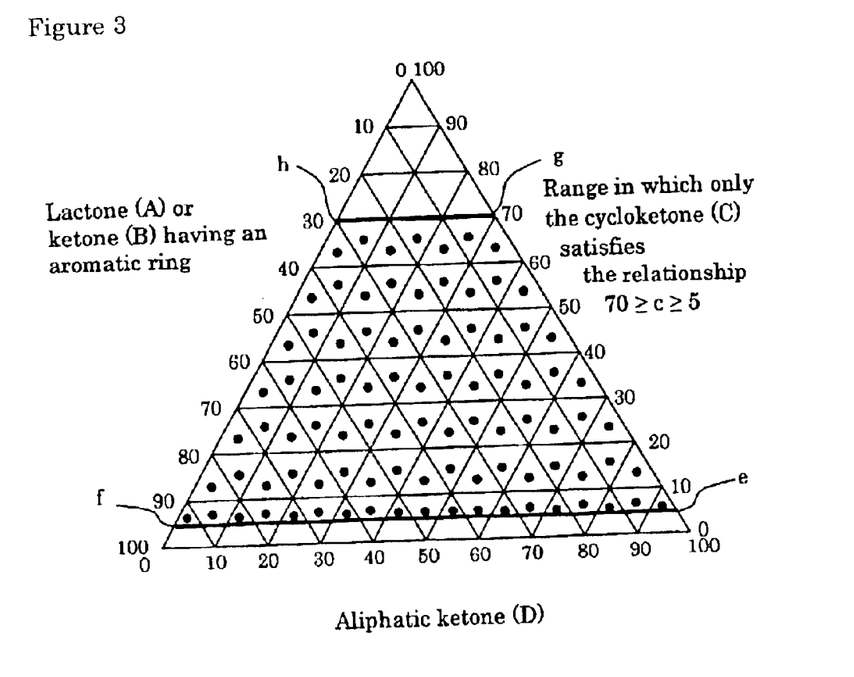
FIG. 3 is a diagram showing the range in which the cycloketone (C) satisfies the relationship $70 \geq c \geq 5$.
Figure 4:
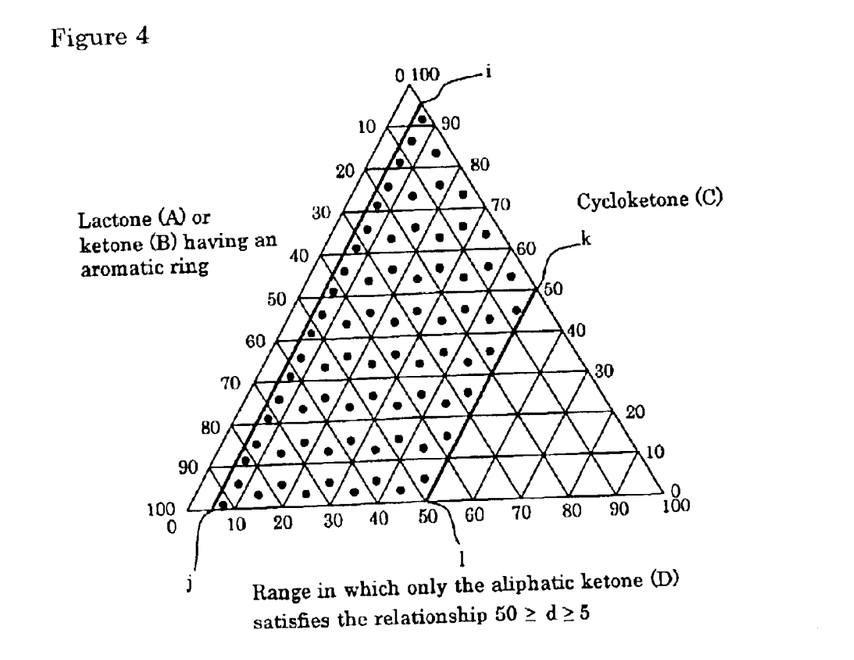
FIG. 4 is a diagram showing the range in which the aliphatic ketone (D) satisfies the relationship $50 \geq d \geq 5$.
Figure 5:
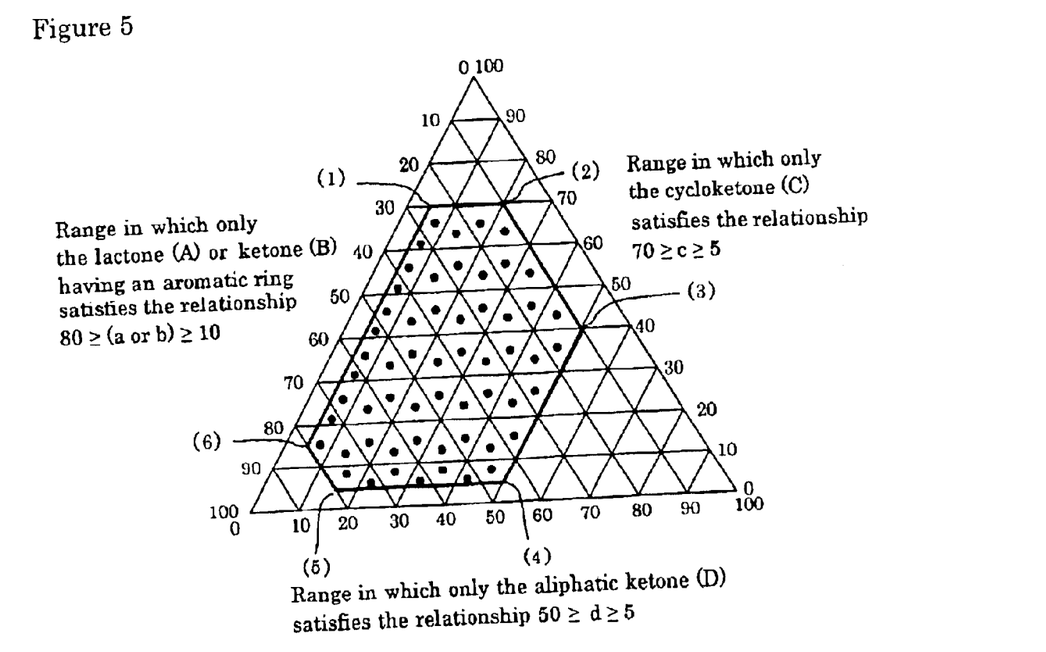
FIG. 5 is a diagram showing the range common to those shown in FIGS. 3 to 5.

FIG. 5 shows the dotted range common to those shown in FIGS. 2 to 4, where the intersection points of the lines defining the dotted range are marked with (1), (2), (3), (4), (5) and (6). The inside of the lines extending to the two relevant intersections coincide with the range in which the relationships of the formula (1) to (4) are simultaneously satisfied, and represents the claims of the present invention.

According to the diagram shown in FIG. 5, the solvents have the following compositions at these intersection points.

| Inter-section points | Lactone (A) or ketone (B) having an aromatic ring | Cycloketone (C) | Aliphatic ketone (D) |
|---|---|---|---|
| (1) | 25 parts by volume | 70 parts by volume | 5 parts by volume |
| (2) | 10 parts by volume | 70 parts by volume | 20 parts by volume |
| (3) | 10 parts by volume | 40 parts by volume | 50 parts by volume |
| (4) | 45 parts by volume | 5 parts by volume | 50 parts by volume |
| (5) | 80 parts by volume | 5 parts by volume | 15 parts by volume |
| (6) | 80 parts by volume | 15 parts by volume | 5 parts by volume |

A mixed solvent having a composition outside of the range defined by the lines extending to the two relevant intersections is not desirable, because it may be incapable of dissolving the polysulfone-based resin, or may only swell the resin to form the gel.

The object of the present invention cannot be achieved by a solvent composed of 2 components selected from the group consisting of the lactone (A) or ketone (B) having an aromatic ring, and cycloketone (C) and aliphatic ketone (D) having a boiling point of 150° C. or lower. It cannot be either achieved even by the 3-component solvent, when the relationships of the formula (1) to (4) are not simultaneously satisfied. These solvent compositions, therefore, are not desirable.

The mechanisms involved are not fully substantiated. However, it is considered that the 3-component solvent of specific composition has a synergistically increased solubility of the polysulfone-based resin, and disperses the only swollen polysulfone-based resin in the aliphatic ketone (D) having a boiling point of 150° C. or lower as a poor solvent to decrease its viscosity, because the component (D) has a low viscosity, with the result that it is sufficiently low in viscosity to give a film of smooth surface when spread on a base.

1.1 Lactone (A) or Ketone (B) Having an Aromatic Ring

For the lactone (A) or ketone (B) having an aromatic ring for the present invention, at least one compound may be selected from the following solvents.

1.1.1 Lactone (A)

The lactone (A) for the present invention is a cyclic compound having ester group (—CO—O—) in the ring. The examples include β-propiolactone (100 to 102° C.), γ-butyrolactone (206° C.), γ-valerolactone (206 to 207° C.), δ-valerolactone (218 to 220° C.), ε-caprolactone (235.3° C.), ethylene carbonate (238° C.), propylene carbonate (90° C. at 5 mmHg), hinokitiol (140 to 141° C. at 10 mmHg) and diketene (127.4° C.), wherein each value in the parentheses means boiling point at 103.3 kPa (=760 mmHg) unless measurement pressure is specifically indicated. One or more of these compounds may be selected.

γ-butyrolactone as one of the representative lactones is represented by the chemical formula (1):

(1)

1.1.2 Ketone (B) Having an Aromatic Ring

Examples of the ketone (B) having an aromatic ring for the present invention include acetophenone (202° C.), p-methyl acetophenone (228° C.), propiophenone (218° C.), 1-phenyl-1-butanone (218 to 221° C.), isopropylphenylketone (217° C.), benzaldehyde (179° C.), o-hydroxy benzaldehyde (196 to 197° C.), m-hydroxy benzaldehyde (191° C. at 50 mmHg), p-hydroxy benzaldehyde (116 to 117° C.) and benzylmethylketone (216° C.), wherein each value in the parentheses means boiling point at 103.3 kPa (=760 mmHg) unless measurement pressure is specifically indicated. One or more of these compounds may be selected.

Acetophenone as one of the representative ketone having an aromatic ring is represented by the chemical formula (2):

(2)

1.2 Cycloketones

The cycloketone (C) for the present invention is a cyclic compound having ketone group (—CO—) in its ring. Those useful for the present invention include cyclobutanone (100 to 102° C.), cyclopentanone (130° C.), cyclohexanone (156.7° C.), heptanone (179 to 181° C.), methylcyclohexanone (165 to 166° C.), cyclooctanone (74° C. at 1.6 kPa), cyclononanone (93 to 95° C. at 1.6 kPa), cyclodecanone (107° C. at 1.7 kPa), cycloundecanone (108° C. at 1.6 kPa), cyclododecanone (125° C. at 1.6 kPa) and cyclotridecanone (138° C. at 1.6 kPa), wherein each value in the parentheses means boiling point at 103.3 kPa (=760 mmHg) unless measurement pressure is specifically indicated. One or more of these compounds may be selected.

Cyclohexanone as one of the representative cycloketone is represented by the chemical formula (3):

(3)

1.3 Aliphatic Ketone (D)

The alicyclic ketone (D) for the present invention is an alicyclic ketone having a boiling point of 150° C. or lower. Those useful for the present invention include acetone (100 to 102° C.), methylethylketone (100 to 102° C.), methylpropylketone (100 to 102° C.), methylisobutylketone (100 to 102° C.), methyl-n-butylketone (100 to 102° C.), methyl-sec-butylketone (100 to 102° C.), diisobutylketone (100 to 102° C.), pinacolone, (106.4° C.), methylisoamylketone (144.9° C.), diethylketone (101.8° C.), diisopropylketone (125.0° C.), ethyl-propylketone (123.2° C.) and butyl-ethylketone (147.3° C.), wherein each value in the parentheses means boiling point at 103.3 kPa (=760 mmHg). One or more of these compounds may be selected.

Methylethylketone as one of the representative aliphatic ketone (D) is represented by the chemical formula (4):

(4)

2. Polysulfone-based Resin

The polysulfone-based resin useful for the present invention is a thermoplastic resin having an aromatic ring group in the main chain and sulfone group as the binding group for the aromatic ring. These resins broadly fall into two categories, polysulfone and polyethersulfone resin.

2.1 Polysulfone Resin

The polysulfone resin (sometimes referred to as PSF) useful for the present invention is a polymer typically having a structure represented by the chemical formula (5):

(5)

The polymer represented by the chemical formula (5) is produced by a desalting process for eliminating sodium chloride with an alkali metal salt of bisphenol A and chlorination compound of bisphenol S as the starting compounds. The polymers represented by the chemical formulae (6) to (13) are produced by substituting bisphenol A into 4,4'-dihydroxy-diphenyl-oxide, 4,4'-dihydroxy-diphenyl-sulfide, 4,4'-dihydroxy-diphenyl-methane, 4,4'-dihydroxy-diphenyl-phenylethane, 4,4'-dihydroxy-diphenyl-perfluoropropane, hydroquinone, 4,4'-dihydroxybenzophenone or 4,4'-dihydroxy-diphenyl. All of these compounds are useful for the present invention.

(6)

(7)

(8)

(9)

(10)

(11)

(12)

(13)

The commercially available PSFs useful for the present invention include Udel® (produced by US's Amoco, Teijin Amoco Engineering Plastics serving as an importation/selling agency) and Udel P-3500® (produced and sold by Nissan Chemical Industries).

2.2 Polyethersulfone Resin

The polyethersulfone resin (sometimes referred to as PES) useful for the present invention is a polymer typically having a structure represented by the chemical formula (14):

(14)

PES can be produced by the Friedel-Crafts reaction with diphenylether chlorosulfone.

The commercially available PESs useful for the present invention include Ultrason E® (produced by German's BASF, Mitsui Chemicals serving as an importation/selling agency), RADEL® A (produced by US's Amoco, Teijin Amoco Engineering Plastics serving as an importation/selling agency) and Sumikaexcel® (produced and sold by Sumitomo Chemical).

3. Polysulfone-based Resin Solution Composition

The polysulfone-based resin solution composition of the present invention comprising at least one type of polysulfone-based resin dissolved in a mixed solvent composed of a lactone (A) or ketone (B) having an aromatic ring, and cycloketone (C) and aliphatic ketone (D) having a boiling point of 150° C. or lower. It is for a laminate comprising a coating layer of the polysulfone-based resin which is formed by spreading and drying the resin solution composition on at least one side of a base.

The polysulfone-based resin is incorporated in the polysulfone-based resin solution composition at 1 to 30 parts by weight per 100 parts by weight of the mixed solvent, preferably 5 to 20 parts. Its content below 1 part by weight is not desirable, because of insufficient viscosity of the resulting composition to have coating layer thickness limited up to 1 μm, although reduced viscosity allows the composition to be spread more easily and extends its service life. The content above 30 parts by weight is also not desirable, because viscosity of the composition is too high to have uniformly thick coating layer and to secure a desirable service life of the composition.

The polysulfone-based resin solution composition may be incorporated, as required, with one or more additives, e.g., antioxidant, UV absorber, antistatic agent, flame retardant, dye, pigment, lubricant, antifungal agent, rust inhibitor and leveling agent. The leveling agents useful for the present invention include calcium, potassium and ammonium perfluoroalkylsulfonate, perfluoroalkylethylenoxide, perfluoroalkyltrimethyl ammonium salt and fluorinated alkyl ester.

The polysulfone-based resin solution composition can be spread on metallic sheets, e.g., those of iron, aluminum, copper, zinc and titanium; glass sheets; and metallic rods, parts and coils, to make them highly resistant to heat, chemicals, impact, scratching and so on. They can find wide applications, e.g., parts of common industrial machines/tools, electric/electronic devices, automobiles, office equipment, kitchen fitments; and pipes and tanks for chemical and pharmaceutical plants. The polysulfone-based resin can be also spread on metallic wires, to make them resistant to heat and chemicals. It can be also used as a coating material.

4. Base

The base for the present invention is of film, sheet, plate, rod, pipe, coil, wire, woven fabric, non-woven fabric, paper or the like. The base is responsible for mechanical strength of the laminate. It is coated, at least one side, with the polysulfone-based resin layer.

The base materials useful for the present invention include plastics, e.g., polyethylene terephthalate, polybutylene terephthalate, polyethylene naphthalate, polybutylene naphthalate, polycarbonate, high-density polyethylene, straight-chain, low-density polyethylene, polypropylene, poly-4-methylpentene-1, polystyrene, polysulfone, polyether sulfone (PES), polyphenylene sulfide, poly-p-phenylene terephthalamide, polyamide, polyetheretherketone, polyarylate, polyphenylene ether, polyphenylene oxide, polyacetal, methyl polymethacrylate, polyacrylonitrile, polychloro-trifluoroethylene, polytetrafluoroethylene, polyparaxylene, polyetherimide, polyimide, polyarylate, polyvinyl chloride, polyurethane, epoxy resin, xylene resin, guanamine resin, diallylphthalate resin, vinyl ester resin, phenol resin, unsaturated polyester resin, furan resin, polyurethane, melamine resin and urea resin; metals, e.g., iron, aluminum, copper, titanium, tin and zinc; inorganic materials, e.g., glass, ceramics, concrete and rocks; and lumber and bamboo.

Of these resins, polyethylene terephthalate is more preferable than the others for the base film, because of its favorable characteristics, e.g., moderate cost, being free of the problems resulting from fisheye or uneven thickness, rigidity to make the film easily handled, and high adhesion to the polysulfone-based resin to make the film laminated at a high adhesive strength.

The starting resins for the resin film may be used either individually or in combination. Thickness of the resin film is, e.g., 1 to 200 $\mu$m, preferably 3 to 150 $\mu$m, more preferably 12 to 100 $\mu$m, still more preferably 20 to 80 $\mu$m. Thickness beyond the above range is not desirable; the film having a thickness below 1 $\mu$m is difficult to handle because of its insufficient rigidity, and the film having a thickness above 200 $\mu$m is difficult to roll because of its excessive rigidity and pushes up the cost because of excessive material cost to cause quality runaway.

The base film may be incorporated, as required, with one or more additives, e.g., antioxidant, UV absorber, antistatic agent, flame retardant, dye, pigment, lubricant, antifungal agent and rust inhibitor.

It may be also treated by corona discharge or undercoating to improve interfacial adhesion to the coating layer of polysulfone-based resin.

5. Coating Layer of Polysulfone-based Resin

The coating layer of polysulfone-based resin for the present invention may be used as an optical film or the like. When used as an optical film or the like, it should have a highly smooth surface.

The coating layer of polysulfone-based resin can be easily laminated on a polyethylene terephthalate film by solvent casting to form a thin film (1 to 15 $\mu$m thick) thereon from a dope. Therefore, it can be a high-quality surface protective film at a lower cost than that formed by dry lamination.

6. Laminate

The laminate of the present invention comprises a coating layer of polysulfone-based resin at least one side of the base film.

The laminate of the present invention is produced by spreading and drying, at least one side of a 1 to 200 $\mu$m thick base film, a dope of polysulfone-based resin, to form the resin layer having a thickness of 0.1 to 100 $\mu$m, preferably 0.5 to 75 $\mu$m, more preferably 1 to 50 $\mu$m. The laminate can be used as an optical film or the like.

7. Process for Producing the Laminate

The laminate of the present invention may be produced by spreading and drying a polysulfone-based resin solution composition on a base film. It may be spread by, e.g., roll coating, spray coating, die coating, knife coating, air knife coating or wire bar coating. The polysulfone-based resin solution composition is preferably kept at 20 to 50° C. while being spread on the base film, viewed from the production cost.

It is preferably dried at 50 to 150° C. for 1 to 5 minutes.

7.1 Wire Bar

Figure 7:
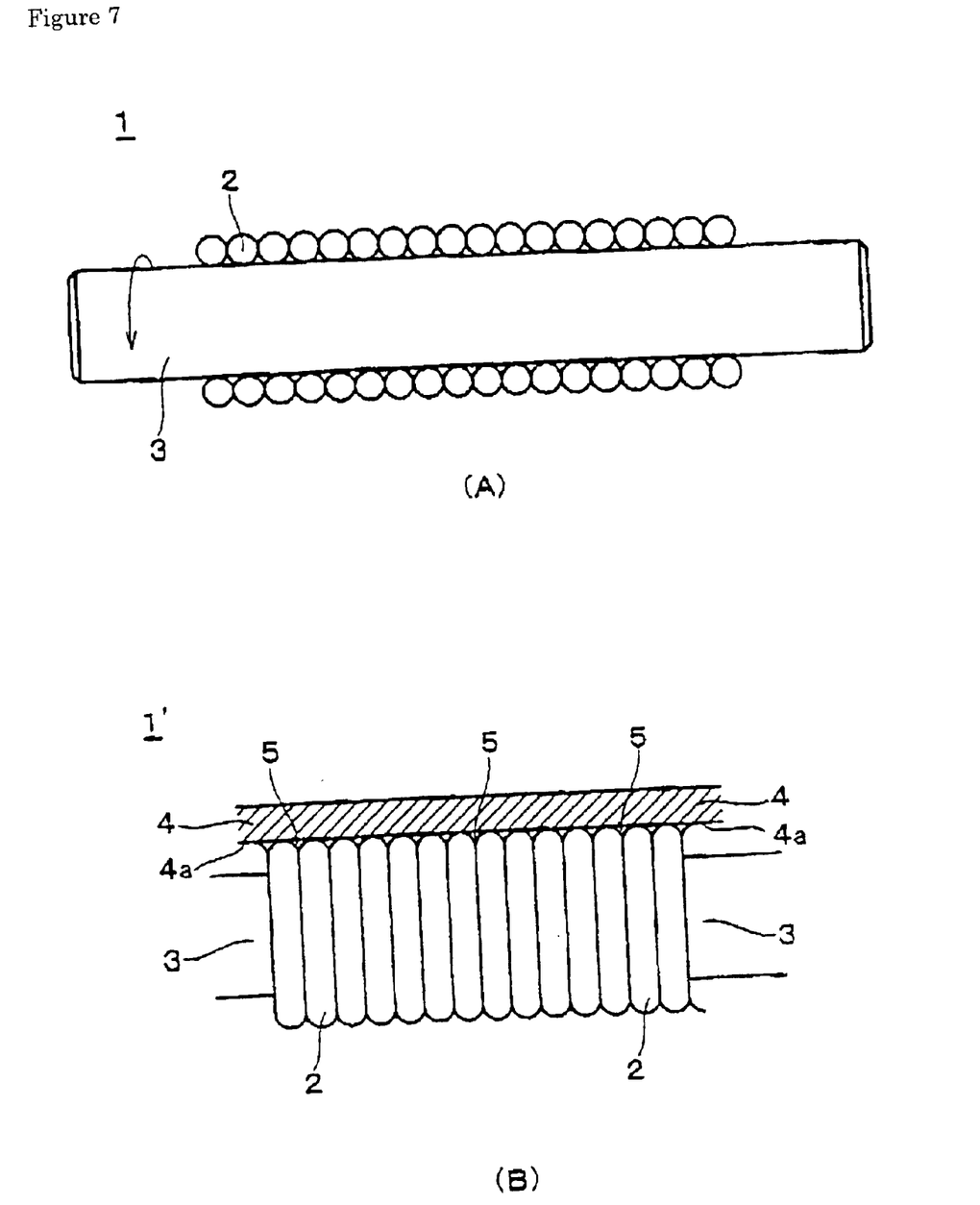
FIG. 7 is a conceptual design of a wire bar, where (A) is a cross-sectional view and (B) is a side view.

The wire bar used for the present invention is not structurally limited. FIG. 7 (A) shows one example. It comprises a circular rod 3 having a diameter of 5 to 25 mm, on which wire 2 is closely wound. The wire has a diameter varying from about 20 to 1000 $\mu$m depending on liquid viscosity and coating layer thickness.

In the wire bar, a number of spaces 5 having a reversed triangular cross-section are formed between the line running on the wire apexes and wound wire as shown in FIG. 7(B). These spaces 5 are filled with the polysulfone-based resin solution composition, which is transferred onto the base film surface 4a to be coated therewith.

7.2 Coater Equipped with a Wire Bar

The coater equipped with a wire bar for the present invention is not structurally limited. Two examples of the preferable ones are illustrated in FIG. 8 (A) and (B).

Figure 8:
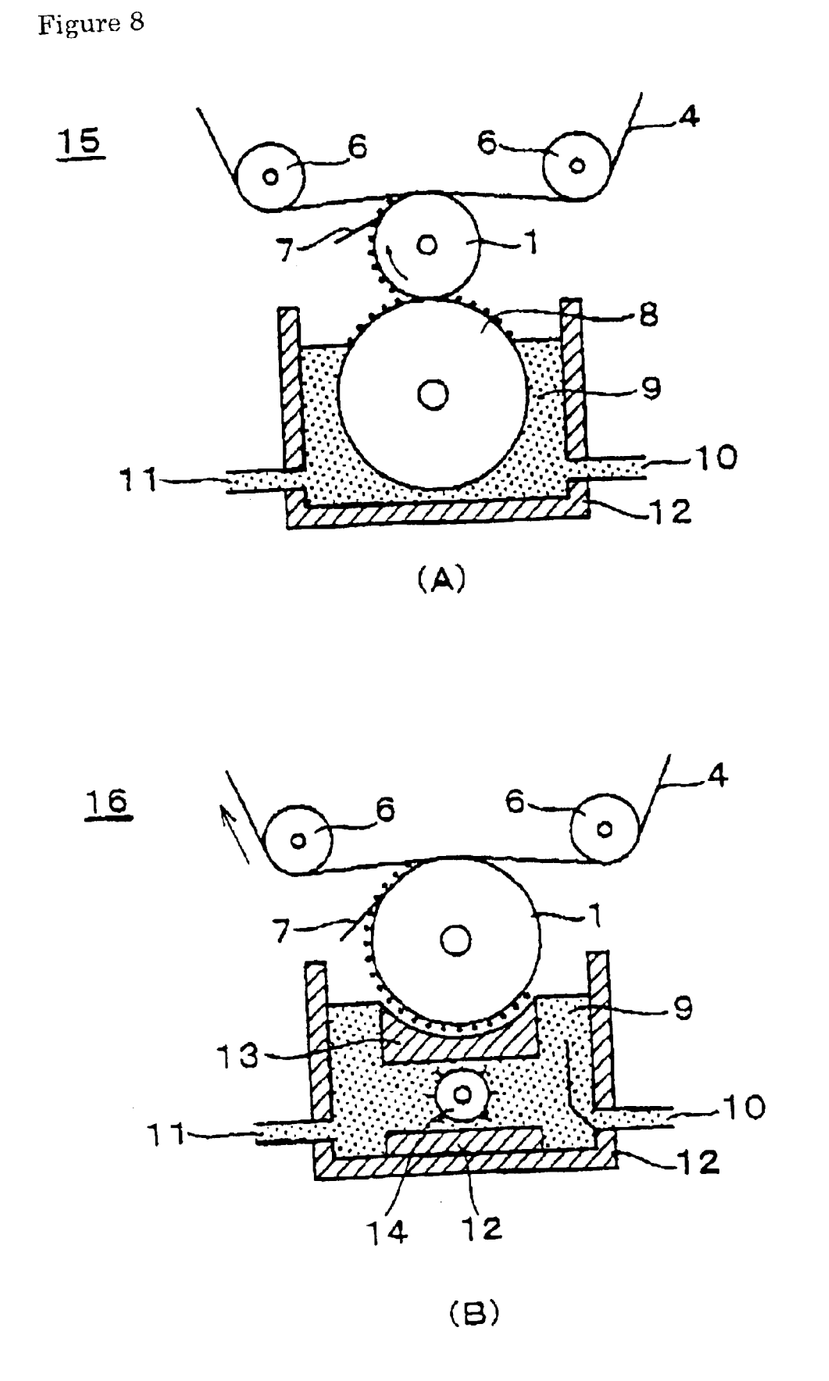
FIG. 8 is a conceptual design of the coater equipped with a wire bar, where (A) is that of the coater equipped with a smaller-diameter wire bar and (B) is that of the coater equipped with a larger-diameter wire bar.

The coater shown in FIG. 8(A) transfers the polysulfone-based resin solution composition 9 to the tank 12 through the solution transfer tube 10, and slowly draws the solution composition 9 by a larger-diameter back-up roll 8 to supply it to the smaller-diameter wire bar 1. This design allows the composition 9 to be supplied at a given rate without being foamed or unevenly distributed. Moreover, it is equipped with the doctor blade 7, which can scrape an excessive quantity of the composition 9 away, to control rate of the solution composition to be spread more accurately, thereby improve surface smoothness of the coating layer.

The solution 9 is continuously discharged through the solution discharge tube 11, to keep component ratio of the solution composition constant and prevent formation of gel which has an adverse effect on the surface smoothness.

The spaces 5 in the wire bar 1 are filled with the solution composition 9, which is evenly transferred onto the starting film surface 4a to be coated therewith, and then dried to produce the laminate.

The coater shown in FIG. 8(B) is a modified version of the one shown in FIG. 8 (A). It is equipped with a wire bar 1, which is larger than that in the one shown in FIG. 8(A), and hence can give the laminate with a thicker coating layer, although comparing slightly unfavorably in surface smoothness.

The concave table 13 has a concave surface which is matched with the external shape of the larger-diameter wire bar 1. They are apart from each other with a gap of the order of several millimeters, to accurately control quantity of the solution composition 9 attaching to the wire bar 1 and thereby to give the laminate of high surface smoothness.

8. Applicable Areas of Laminate

The laminate of the present invention can be used for various purposes, including heat-resistant optical film excellent in surface smoothness and outer appearances for base film which supports a transparent electrode for liquid crystal displays, among others.

EXAMPLES

The polysulfone-based resin solution composition and laminate of the present invention are described in detail by EXAMPLES, which by no means limit the present invention.

Example 1

Figure 6:
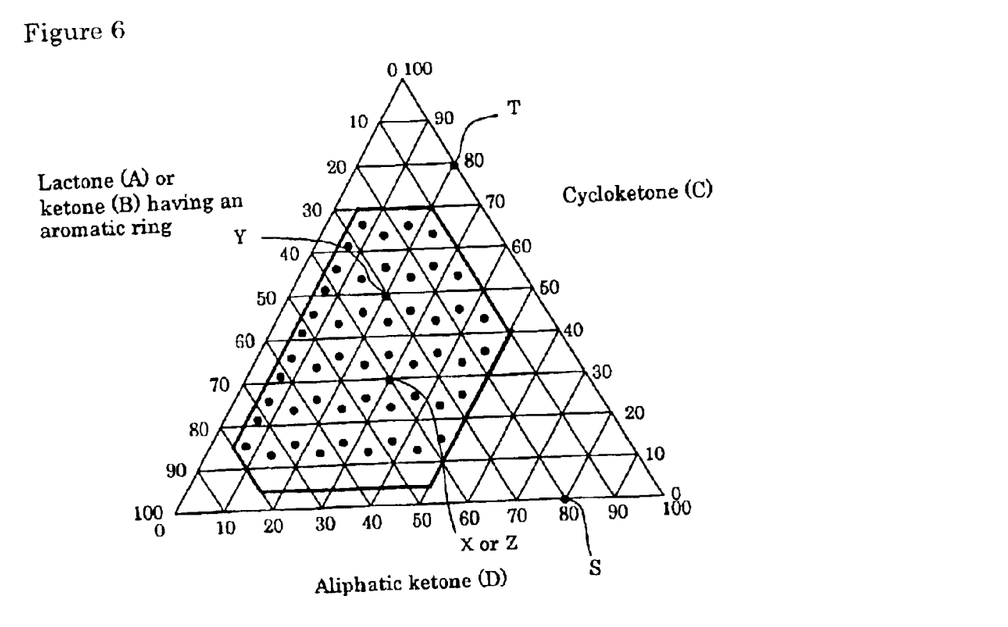
FIG. 6 is a diagram showing the mixed solvent compositions used in EXAMPLES and COMPARATIVE EXAMPLES.

100 parts of a mixture composed of γ-butyrolactone (40% by volume), cyclohexane (30% by volume) and methylethylketone (30% by volume), which corresponds to the composition "X" shown in FIG. 6, was incorporated with 10% by weight of polyether sulfone resin (PES) (Sumitomo Chemical's Sumikaexcel® PES5003P), and the resulting mixture was stirred for 24 hours to prepare the polyether sulfone resin solution composition.

Then, the polyether sulfone resin solution composition was spread on a 100 μm thick polyethylene terephthalate (PET) film (Teijin Dupont's Tetron® S) as a base film by a coater shown in FIG. 8(A) equipped with a wire bar shown in FIG. 7, in such a way to form the coating layer having a thickness of 2 μm (dry basis).

The resulting laminate was dried at 150° C. for 5 minutes in an oven, and the drying step was completed after the coating layer was confirmed not sticky.

The evaluation results are given in Table 1.

Example 2

100 parts of a mixture composed of γ-butyrolactone (30% by volume), cyclohexane (50% by volume) and methylethylketone (20% by volume), which corresponds to the composition "Y" shown in FIG. 6, was incorporated with 5% by weight of polyether sulfone resin (PES) (Sumitomo Chemical's Sumikaexcel® PES5003P), and the resulting mixture was stirred for 24 hours to prepare the polyether sulfone resin solution composition.

Then, the polyether sulfone resin solution composition was spread on a 100 μm thick polyethylene terephthalate (PET) film (Teijin Dupont's Tetron® S) as a base film by a coater shown in FIG. 8(A) equipped with a wire bar shown in FIG. 7, in such a way to form the coating layer having a thickness of 2 μm (dry basis).

The resulting laminate was dried at 150° C. for 5 minutes in an oven, and the drying step was completed after the coating layer was confirmed not sticky.

The evaluation results are given in Table 1.

Example 3

100 parts of a mixture composed of acetophenone (40% by volume), cyclohexanone (30% by volume) and methylethylketone (30% by volume), which corresponds to the composition "Z" shown in FIG. 6, was incorporated with 5% by weight of polysulfone resin (PSF) (Nissan Chemical Industries' Udel® P-3500), and the resulting mixture was stirred for 24 hours to prepare the polysulfone resin solution composition.

Then, the polysulfone resin solution composition was spread on a 100 μm thick polyethylene terephthalate (PET) film (Teijin Dupont's Tetron® S) as a base film by a coater shown in FIG. 8(A) equipped with a wire bar shown in FIG. 7, in such a way to form the coating layer having a thickness of 2 μm (dry basis).

The resulting laminate was dried at 150° C. for 5 minutes in an oven, and the drying step was completed after the coating layer was confirmed not sticky.

The evaluation results are given in Table 1.

Comparative Example 1

100 parts of a mixture composed of γ-butyrolactone (20% by volume) and methylethylketone (80% by volume), which corresponds to the composition "S" shown in FIG. 6, was incorporated with 10% by weight of polyether sulfone resin (PES) (Sumitomo Chemical's Sumikaexcel® PES5003P), and the resulting mixture was stirred for 24 hours to prepare the polyether sulfone resin solution composition.

The polyether sulfone resin composition contained the resin left undissolved, and was not spread on the base film.

The evaluation results are given in Table 1.

Comparative Example 2

100 parts of a mixture composed of cyclohexanone (80% by volume) and methylethylketone (20% by volume), which corresponds to the composition "T" shown in FIG. 6, was incorporated with 10% by weight of polyether sulfone resin (PES) (Sumitomo Chemical's Sumikaexcel® PES5003P), and the resulting mixture was stirred for 24 hours to prepare the polyether sulfone resin solution composition. The polyether sulfone resin composition was found to be whitened and thickened in 10 hours for which it was left to stand after the resin was dissolved, and was not spread on the base film.

The evaluation results are given in Table 1.

Comparative Example 3

100 parts of a mixture composed of dimethylformamide (20% by volume), cyclohexanone (40% by volume) and methylethylketone (40% by volume) was incorporated with 10% by weight of polyether sulfone resin (PES) (Sumitomo Chemical's Sumikaexcel® PES5003P), and the resulting mixture was stirred for 24 hours to prepare the polyether sulfone resin solution composition.

Then, the polyether sulfone resin solution composition was spread on a 100 μm thick polyethylene terephthalate (PET) film (Teijin Dupont's Tetron® S) as a base film by a coater shown in FIG. 8(A) equipped with a wire bar shown in FIG. 7, in such a way to form the coating layer having a thickness of 2 μm (dry basis).

The resulting laminate was dried at 150° C. for 5 minutes in an oven, and the drying step was completed after the coating layer was confirmed not sticky.

The evaluation results are given in Table 1.

TABLE 1

| | Resin | Resin content part(s) by weight | Solvent Composition | | | | | Liquid conditions | Film outer appearances | |
|---|---|---|---|---|---|---|---|---|---|---|
| | | | GBL | Aceto-phenone | DMF | Anone | MEK | | | |
| EXAMPLE 1 | PES | 10 | 40 | | | 30 | 30 | Dissolved | ○ Good | ○ |
| EXAMPLE 2 | PES | 5 | 30 | | | 50 | 20 | Dissolved | ○ Good | ○ |
| EXAMPLE 3 | PSF | 5 | | 40 | | 30 | 30 | Dissolved | ○ Good | ○ |
| COMPARATIVE EXAMPLE 1 | PES | 10 | 20 | | | | 80 | Not dissolved | x — | — |

TABLE 1-continued

|  | Resin | Resin content part(s) by weight | Solvent Composition | | | | | Liquid conditions | | Film outer appearances | |
|---|---|---|---|---|---|---|---|---|---|---|---|
|  |  |  | GBL | Aceto-phenone | DMF | Anone | MEK |  |  |  |  |
| COMPARATIVE EXAMPLE 2 | PES | 10 |  |  |  | 80 | 20 | Gelled | x | — | — |
| COMPARATIVE EXAMPLE 3 | PES | 10 |  |  | 20 | 40 | 40 | Dissolved | o | Irregular | x |

PES: Polyether sulfone resin
PSF: Polysulfone resin
GBL: γ-butyrolactone
DMF: Dimethylformamide
Anone: Cyclohexanone
MEK: Methylethylketone Solution Conditions
    Dissolved o: Containing no undissolved substance, and showing no change in the liquid for 10 hours under a sealed condition after the resin is dissolved
    Not dissolved x: Containing the resin left undissolved
    Gelled x: Found to be whitened and thickened in 10 hours for which the sample is left to stand after the resin it dissolved
Film Outer Appearances
    Good o: The film is smooth after being dried
    Irregular x: The film is wavy and lacks smoothness, after being dried
Evaluation Results

Examples 1 to 3

The solution composition was stable, and the film thereof was smooth.

Comparative Example 1

The composition contained the resin left undissolved, and could not be spread.

Comparative Example 2

The liquid was thickened, and could not be spread.

Comparative Example 3

The coating layer was notably wavy, and showed defective outer appearances.

Example 4

The laminate prepared in EXAMPLE 1 was used to produce a liquid crystal display as one of its uses by the following procedure.

The laminate prepared in EXAMPLE 1 was treated by DC magnetron sputtering with a mixed gas of oxygen and argon (9%) at $3\times10^{-1}$ Pa, introduced in the system at $3\times10^{-4}$ Pa as initial degree of vacuum, to have a 500 Å thick $SiO_2$ film. Next, it was treated also by DC magnetron sputtering with a mixed gas of oxygen and argon (4%) at $1\times10^{-1}$ Pa, introduced in the system at $3\times10^{-4}$ Pa as initial degree of vacuum, to have an indium tin oxide (ITO, In/In+Sn atomic ratio: 0.98) film as a transparent electroconductive film. The film had a thickness of 1600 Å and resistivity of $4\times10^{-4}$ Ω·cm. A resist was spread and developed on the ITO film, and etched with 10% by volume HCl as the etchant kept at 40° C. to have a display pattern with a diagonal length of 3 in. and L/S 150/50 μm. The patterned laminate was coated with an oriented film for STN, fired at 150° C. for 2 hours, and rubbing-treated to have an orientation of 240 degree twist. Spacers are distributed and a sealant was spread on the rubbed surface, and the sealant was cured at 130° C., to prepare a cell, into which a liquid crystal composition for STN was injected. A polarizing plate was put on the laminate at a position to have the maximum contrast, to prepare a liquid crystal display.

Evaluation Results

The liquid crystal display was lighting-tested at a driving voltage in a range of ±5V around 0V, to have satisfactory results showing no uneven display resulting from abnormal cell gap.

Advantage of the Invention

The polysulfone-based resin solution composition of the present invention has advantages of stable solution composition, containing no undissolved resin left in the liquid, showing neither thickening nor gelation, giving a smooth coating layer when spread on a base film, and not generating any harmful component.

The laminate prepared by spreading and drying the polysulfone-based resin solution composition on a base film is excellent in surface smoothness and optical characteristics, and can be used for heat-resistant optical films.

What is claimed is:

1. A polysulfone-based resin solution composition prepared by dissolving at least one type of polysulfone-based resin in a mixed solvent composed of a lactone (A) or ketone (B) having an aromatic ring, and cycloketone (C) and aliphatic ketone (D) having a boiling point of 150° C. or lower.

2. The polysulfone-based resin solution composition according to claim 1 which simultaneously satisfies the following formulae (1) to (4), wherein "a," "b," "c" and "d" are contents (parts by volume per 100 parts by volume of said mixed solvent) of said lactone (A), ketone (B), cycloketone (C) and aliphatic ketone (D), respectively:

$$80 \geq (a \text{ or } b) \geq 10 \tag{1}$$

$$70 \geq c \geq 5 \tag{2}$$

$$50 \geq d \geq 5 \tag{3}$$

$$(a \text{ or } b) + c + d = 100 \tag{4}$$

3. The polysulfone-based resin solution composition according to claim 1, wherein said polysulfone-based resin is incorporated at 1 to 30 parts by weight per 100 parts by weight of said mixed solvent.

4. A laminate with a coating layer of polysulfone-based resin which is formed by spreading and drying the polysulfone-based resin solution composition of one of claims 1 to 3 on at least one side of a base.

* * * * *